United States Patent [19]
McClean

[11] Patent Number: 4,872,764
[45] Date of Patent: Oct. 10, 1989

[54] COCKTAIL SHAKER

[75] Inventor: John W. McClean, Lakemba, Australia

[73] Assignee: Breville R & D Pty. Ltd., Pyrmont, Australia

[21] Appl. No.: 212,198

[22] Filed: Jun. 27, 1988

[30] Foreign Application Priority Data

Jun. 30, 1987 [AU] Australia ................ PI2790

[51] Int. Cl.$^4$ .................................... B01F 7/22
[52] U.S. Cl. ................... 366/251; 366/280; 366/308; 241/282.2
[58] Field of Search .......... 366/251, 326, 330, 308, 366/279, , 312, 309, 311, 280, 276, 278, 285; 241/282.21, 282.2

[56] References Cited

U.S. PATENT DOCUMENTS

| | | | |
|---|---|---|---|
| 1,436,172 | 11/1922 | Trask | 366/251 |
| 1,841,435 | 1/1932 | Gibson | 366/308 |
| 3,559,962 | 2/1971 | Enssle | 366/308 |

FOREIGN PATENT DOCUMENTS 1016037  9/1957  Fed. Rep. of Germany ...... 366/308

Primary Examiner—Robert W. Jenkins
Attorney, Agent, or Firm—Jones, Askew & Lunsford

[57] ABSTRACT

A beverage processing apparatus consisting of an outer housing having an upper portion and a lower portion which together form a closed processing vessel for containing a beverage mixture, the upper portion containing a driving motor that drives the shaft which has on it one or more processing blades, the invention being characterized by the fact that the blade or blades are pivotally attached to the shaft so as to be capable of folding up against the shaft as it is introduced into a mixture to be processed containing, for example, ice cubes, and thereafter under the influence of centrifugal force to take up a position substantially at right angles to the shaft to effect efficient processing. It is preferred that the or each blade has a surface upwardly inclined in relation to a plane at right angles to the axis of the shaft to promote folding of the blade in the event of it striking an obstacle during processing.

5 Claims, 3 Drawing Sheets

COCKTAIL SHAKER

The present invention relates to food processors and in particular to a beverage mixing apparatus with improved processing characteristics.

It is well known that many beverages including cocktails, fruit cups and punches are best processed using a closed container. The contents held within are processed either by manual shaking or by some mechanical mixing means. Typical of the prior art has been a beverage mixing apparatus consisting of a two part housing sealably adapted to fit together so as to form a closed mixing vessel. Also known to the art has been such an apparatus further including electrical drive means rotating one or more processing elements at high speed.

A problem in the prior art has arisen in that conventional processing elements are not always suitable for processing certain beverages such as those listed above. For certain beverages it is desirable that a concoction of ice cubes, fruit and other solid or semi-solid matter be processed. It has been discovered that these materials, especially ice, are prone to packing thus causing resistance and jamming of known processing means. In extreme cases such jamming can lead to complete breakdown of the food processing unit.

The undesirable packing as described above is manifested not only during processing but also occurs in the static phase when the user attempts to introduce the processing elements into the beverage mixture whilst attempting to sealably close the two part vessel.

The present invention overcomes the problem of the prior art by providing a beverage mixing apparatus allowing for both easy introduction of processing elements into the beverage mixture together with improved performance during operation.

According to the present invention there is provided a beverage processing apparatus comprising an outer housing consisting of an upper portion removably attached to a lower portion to form a closed processing vessel for containing a beverage mixture, the upper portion including drive means to rotate a processing assembly which extends into the lower portion, characterized in that the processing assembly consists of a shaft adapted to be driven by said drive means, pivotally attached to which is at least one processing blade which is constructed and arranged to fold against the shaft on introduction of the shaft to a beverage mixture containing ice or other solid materials and in use to extend substantially at right angles to the shaft under the influence of centrifugal force and to deflect into a neutral position in which the blade lies close alongside the shaft upon an adverse collision with solids in the beverage mixture.

In order that the nature of the invention may be better understood a preferred form thereof is hereunder described by way of example with reference to the accompanying drawings in which.

Figure 1:
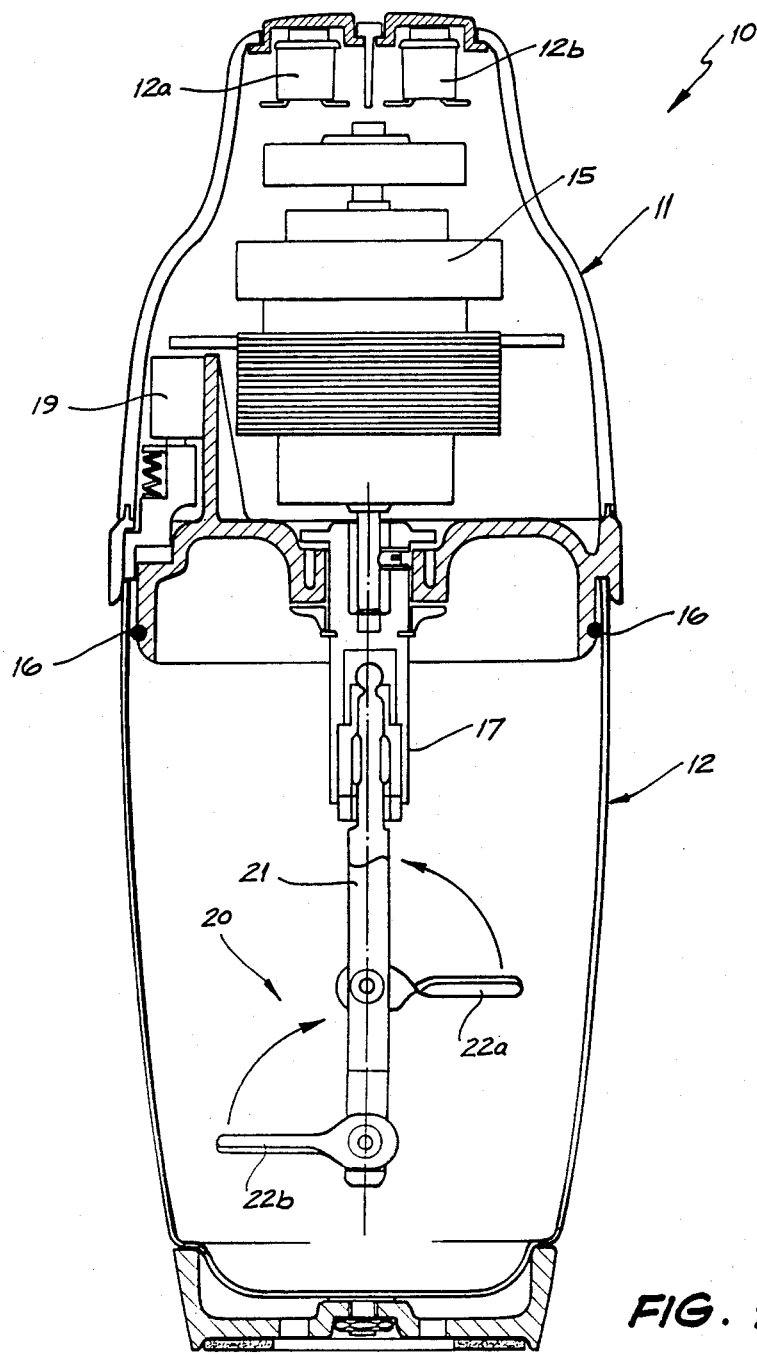
FIG. 1 is a side elevation of an apparatus incorporating the invention.

In FIG. 1 a beverage mixing apparatus is shown generally at 10 and consists of an upper housing 11 made from any suitable plastics material and a lower portion 12 either made from or lined with stainless steel and being adapted to contain the beverage mixture. The upper housing 11 is provided with operating switches 12a, 12b used to regulate an electric motor 15, which is used to drive processing assembly receiver means 17 which protrude outwardly and downwardly from upper housing 11. Upper housing 11 is adapted to receive and, by means of an "O" ring 16, seal with lower portion 12 so as to provide a closed leak-proof vessel for high speed mixing.

Whilst the present invention may have other benefits and advantages it is contemplated that its principal use will be for processing beverage mixtures which contain solid components such as ice. It is contemplated that the user will firstly concoct a beverage in lower portion 12 and then sealably locate it within upper housing 11. The present invention allows such action to be performed with facility as will be described at a later stage. In order to protect the user from accident a microswitch 19 is provided within upper housing 11 and serves to disable electric motor 12 unless secure sealing of the unit has been effected. The processing element is shown generally at 20 and more particularly in FIGS. 2 and 3. It comprises a shaft 21 adapted to be frictionally located within receiving member 17 and includes two processing blades 22a, 22b disposed at 180° to one another and hingedly connected to said shaft 21. The processing blades 22a, 22b are capable of hinged movement into a vertical attitude approximating the longitudinal axis of shaft 21.

Figure 2:
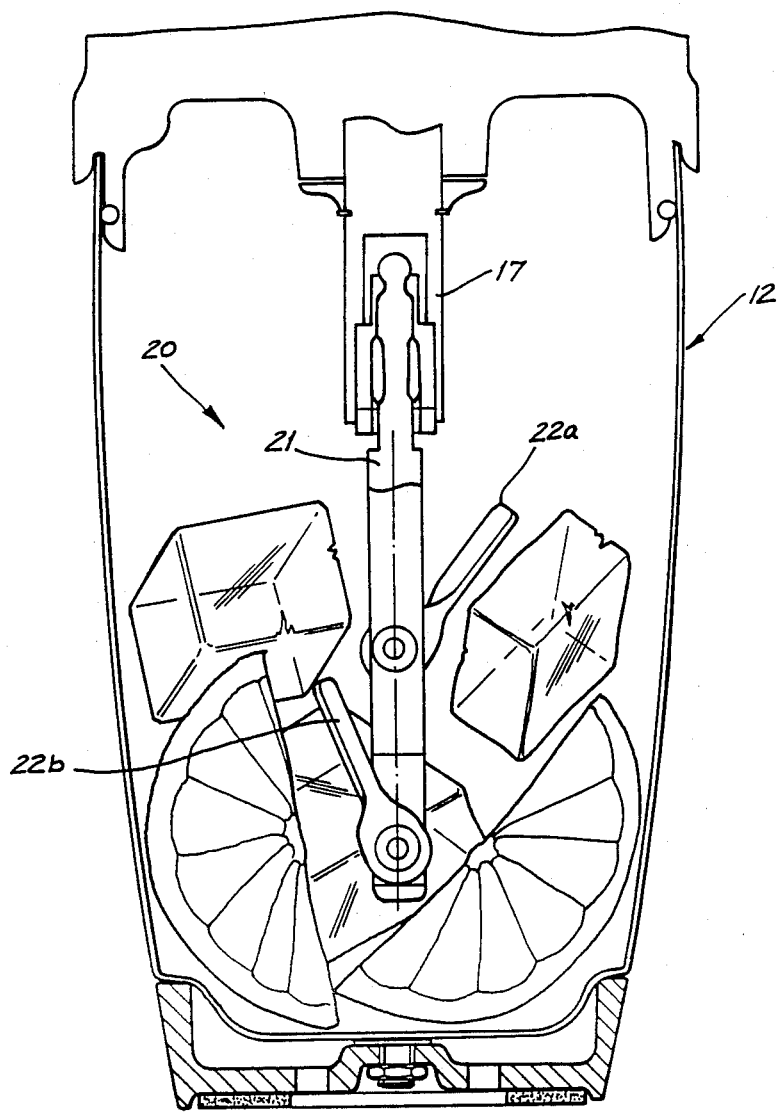
FIG. 2 is a detail of FIG. 1 also showing typical solids and semi-solids of the beverage mixture.

It can now be appreciated that such movement allows easy entry of the processing element 20 into the beverage mixture, the prior art processing means suffering obstruction from ice packing and the like. This facility is shown in FIG. 2 wherein the processing blades 22a, 22b are partially upfolded within the beverage mixture.

Figure 3:
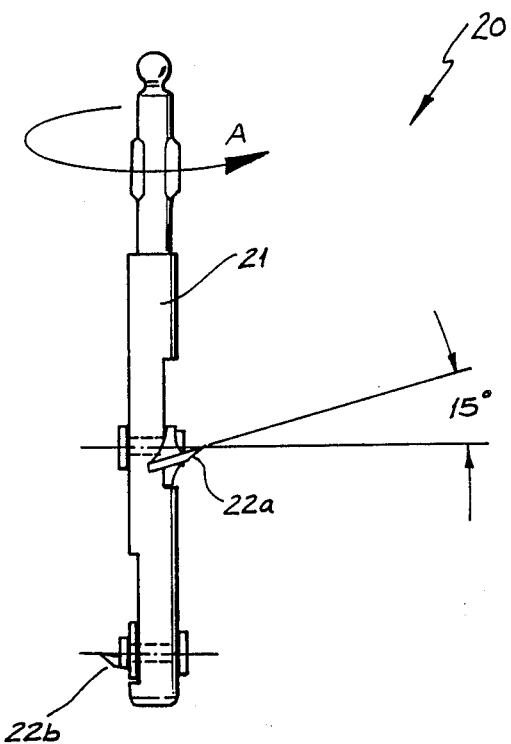
FIG. 3 is a side elevation of a processing element according to the invention.

When the electric motor 15 is activated processing element 20 is rotated at high velocity in the direction of rotation indicated by the letter A in FIG. 3 and centrifugal force maintains processing blades 22a and 22b in substantially horizontal attitudes as shown in FIG. 1. It will be appreciated that this position represents the most efficient processing position. As shown in FIG. 3 the processing blades 22a, 22b are angled such that their cutting plane lies 15° C. above the horizontal. This design performs a two-fold function. Firstly, whilst centrifugal force maintains the horizontal attitude of the blades with respect to shaft 21, the inclination of the blade face produces a downward current within the mixture and thus promotes thorough mixing and processing. Secondly, the inclination of the blade assists upward folding during a potential jamming situation. In particular, prior art fixed cutting members allowed no scope for avoidance of a jamming situation. A hinged processing blade such as that according to the present invention allows for the avoidance of a potential jamming collision. Furthermore, the inclination of the blade as described above further promotes reliability during operation by increasing the probability that an adverse collision will result in the processing blade deflecting away from the collision object and into a neutral position. Immediately thereafter, centrifugal force restores the deflected blade into its horizontal position restoring maximum processing efficiency.

It will be recognised by persons skilled in the art that numerous variations and modifications may be made to the invention as described above without departing from the spirit or scope of the invention as hereinafter defined.

I claim:

1. A beverage processing apparatus comprising:

an outer housing including an upper portion removably attached to a lower portion to form a closed processing vessel for containing a beverage mixture;

the upper portion including drive means to rotate a processing assembly which extends into the lower portion;

the processing assembly including a shaft adapted to be driven by said drive means;

at least one processing blade hingedly attached to the shaft so that the blade can upwardly fold against the shaft to a neutral position in which the blade lies alongside the shaft, on introduction of the shaft to a beverage mixture containing ice or other solid materials;

the blade including a portion lying in a plane tilted upwardly in relation to the axis and rotation of the shaft and operative to promote deflection of the blade towards the neutral position on the blade striking an obstacle during processing; and the blade being operative in use to extend substantially at right angles to the shaft under the influence of centrifugal force and to deflect into the neutral position in which the blade lies close alongside the shaft upon an adverse collision with solids in the beverage mixture.

2. A beverage processing apparatus as claimed in claim 1, wherein the said portion lies at an angle of the order of 15° to a plane substantially perpendicular to the shaft.

3. A beverage processing apparatus as claimed in claim 1 wherein there are two processing blades spaced apart along the length of the shaft.

4. A beverage processing apparatus as claimed in either of claims 1 and 2 wherein each blade has a cutting edge formed on it to cut materials during processing.

5. Apparatus as in claim 1, further comprising:

means operative to prevent the blade from pivoting substantially below a right angle to the shaft while permitting said upward folding, so that the blade extends substantially at a right angle to the shaft except when contacted by a solid material in the beverage mixture.

* * * * *